United States Patent [19]

Oosawa et al.

[11] Patent Number: 4,715,184

[45] Date of Patent: Dec. 29, 1987

[54] KNOCK CONTROL SYSTEM FOR SUPERCHARGED INTERNAL COMBUSTION ENGINE

[75] Inventors: Kouichi Oosawa; Yoshiaki Kinoshita, both of Susono, Japan

[73] Assignee: Toyota Jidosha Kabushiki Kaisha, Aichi, Japan

[21] Appl. No.: 901,819

[22] Filed: Aug. 29, 1986

[30] Foreign Application Priority Data

Sep. 10, 1985 [JP]  Japan ................................ 60-198589

[51] Int. Cl.$^4$ .............................................. F02D 23/00
[52] U.S. Cl. ..................................... 60/602; 123/425; 123/564
[58] Field of Search ................. 60/600, 601, 602, 603, 60/611; 123/564, 425, 435

[56] References Cited

U.S. PATENT DOCUMENTS 4,594,983  6/1986  Takahashi et al. ............... 60/602 X
4,612,900  9/1986  Iwata et al. ....................... 60/602 X
4,646,522  3/1987  Mamiya et al. .................... 60/602

FOREIGN PATENT DOCUMENTS 58-167881  10/1983  Japan .

Primary Examiner—Stephen F. Husar
Attorney, Agent, or Firm—Parkhurst & Oliff

[57] ABSTRACT

A supercharged engine knock control system of the class in which spark advance is retarded by a retard correction value varying in response to an occurrence of knocking is improved in such a manner that the retard correction value computed under engine conditions which do not accurately reflect the octane rating of the fuel is not taken into account in determining the boost pressure control. To this end, the knock control system comprises a memory for storing predetermined engine load threshold values that vary depending on engine speed. Boost pressure is lowered when the actual engine load is greater than the engine load threshold value and when the retard correction value is greater than a reference value.

4 Claims, 10 Drawing Figures

KNOCK CONTROL SYSTEM FOR SUPERCHARGED INTERNAL COMBUSTION ENGINE

BACKGROUND OF THE INVENTION

1. Field of the Invention

The present invention relates to a knock control system or detonation control system for a supercharged spark-ignition engine.

2. Description of the Related Art

In gasoline engines, knocking or detonation occurs because of various factors, such as the fuel octane rating, ignition timing, cylinder pressure, engine temperature, intake air temperature, moisture content of intake air, etc..

In supercharged engines, knocking tends to occur more frequently because of the additional air/fuel mixture forced into the engine cylinders and raising of the intake air temperature by adiabatic compression.

Known in the art is a knock control system for preventing or reducing the magnitude of knocking. In this system, a basic spark advance $\theta_B$ is determined in response to an actual engine speed and engine load. A knock sensor senses the occurrence or absence of knocking and increments or decrements a retard correction value $\theta_K$ in response thereto. Then, the retard correction value $\theta_K$ is subtracted from the basic spark advance $\theta_B$ to determine an executive spark advance; $\theta_{EX} \leftarrow \theta_B - \theta_K$. An electronic ignition system is controlled to generate an igniting spark at the executive spark advance $\theta_{EX}$. In this way, the spark advance is retarded in such a manner that the frequency and level of knocking are reduced to an acceptable standard.

It is customary to set the basic spark advance $\theta_B$ so that the ignition timing is advanced just before knocking starts to occur when the engine is operated with leaded gasoline. Therefore, when a low octane-rating regular gasoline is used, the abovementioned retard correction value $\theta_K$ is considerably increased so that the spark advance is excessively retarded. This raises the exhaust gas temperature, which adversely affects the exhaust gas purifier device provided in the exhaust system and increases fuel consumption.

To overcome the foregoing disadvantages, a knock control method has been proposed in which the supercharger boosting pressure is lowered when the retard correction value $\theta_K$ exceeds a predetermined reference value of, for example, 5 degrees crank angle (see Japanese Unexamined Patent Publication No. 58-167881). According to this method, the supercharger is overridden when the retard correction value $\theta_K$ becomes greater than 5° CA. This method enables a supercharged engine to be operated with regular gasoline and in a knock control mode while avoiding an undesirable rise in the exhaust gas temperature, because the retard correction value $\theta_K$ is limited to the reference value of 5° CA. When the engine is run on leaded gasoline, the retard correction value $\theta_K$ normally will not exceed 5°CA so that the supercharger continues to operate, and thus a high engine output is maintained.

In this method, however, the determination of whether to reduce or increase the boosting pressure is made without regard to the actual engine load, i.e., the boost pressure is maintained whenever the retard correction value $\theta_K$ is smaller than the predetermined reference value. This brings about the following disadvantages when the engine is run on regular gasoline. During a light load condition, the engine will run without knocking despite the use of regular gasoline. This is because the cylinder pressure is low enough to avoid knocking since the engine cylinders draw only limited amount of air/fuel mixture. Thus, during the light load condition of the engine, the retard correction value $\theta_K$ will be sufficiently decremented to permit supercharging. But, if the engine load is suddenly increased during a transition condition of the engine, knocking will occur since the engine is running on regular gasoline, and the retard correction value $\theta_K$ is therefore increased. As the $\theta_K$ value becomes greater than 5° CA, the supercharger is overridden to lower the boosting pressure. This causes hunting at a boost pressure control valve, such as a waste gate valve in the case of a turbocharger, and a bypass control valve in the case of an engine-driven supercharger. Another disadvantage is that, during the transition condition, there is a considerable time delay before the boost pressure is adequately reduced, because the retard correction value $\theta_K$ can be incremented only gradually. This results in an excessive rise in the exhaust gas temperature and increases the fuel consumption.

SUMMARY OF THE INVENTION

The object of the present invention is to overcome the foregoing disadvantages and to improve the prior art knock control system in such a manner that the boost pressure is controlled by excluding the effect of the retard correction value $\theta_K$ under those operating conditions of the engine in which the octane rating of the fuel is not accurately reflected in the retard correction value $\theta_K$.

According to the invention, this is achieved by a knock control system of the class described above, which further comprises memory means for storing predetermined engine load threshold values for different engine speeds, means for sensing an actual engine speed, means responsive to the actual engine speed for accessing the memory means and retrieving therefrom a predetermined engine load threshold value for the actual engine speed, means for sensing an actual engine load, means for comparing the actual engine load with the predetermined engine load threshold value for the actual engine speed, and means for reducing the boost pressure when the actual engine load is greater than the engine load threshold value and when the retard correction value is greater than the reference value.

In a preferred embodiment of the invention, the predetermined engine load threshold values stored in the memory are approximations of an engine load/engine speed characteristic for a retard correction value $\theta_K$ ranging from 5 to 7 degrees as empirically determined when an engine was run on regular gasoline.

DESCRIPTION OF THE PREFERRED EMBODIMENTS

Figure 1:
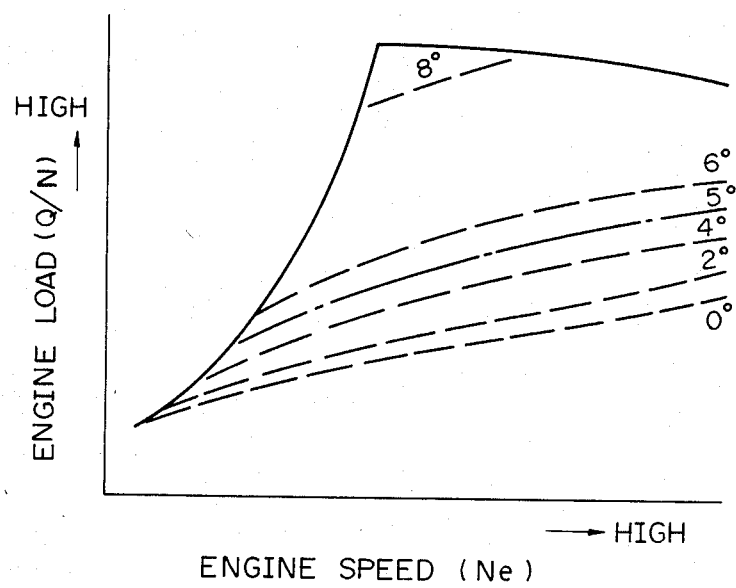
FIG. 1 is a graph showing the engine load/engine speed characteristic for different retard correction values $\theta_K$ as experimentally measured in a prior art knock control system.

The disadvantages encountered in the prior art knock control system and the concept of the present invention will be first discussed in more detail with reference to FIG. 1. The present inventors have conducted experiments to determine how the retard correction value $\theta_K$ in the knock control system varies in terms of the engine load and engine rotational speed when the engine is run on regular gasoline. The results are plotted by dotted lines in FIG. 1, wherein the abscissa represents the engine speed Ne and the ordinate indicates the engine load expressed in terms of the amount of intake air per one revolution of the engine Q/N. In the graph of FIG. 1, the dotted line curve marked 0° indicates the engine operating conditions in which the retard correction value $\theta_K$ is 0° CA, and the curve marked 2° indicates the engine conditions in which $\theta_K$ is 2°, and so on. The solid line indicates the maximum output. As mentioned hereinbefore, in a knock control system the basic spark advance $\theta_B$ is set in terms of the engine load and speed in such a manner that the spark timing is advanced just before knocking starts to occur when the engine is run on leaded gasoline, and the retard correction value $\theta_K$ is termed as a retardation from the basic spark advance $\theta_B$. Therefore, the curve marked 0° in the graph of FIG. 1 indicates the engine operating conditions in which the retard correction value $\theta_K$ is zero, although the engine is run on regular gasoline. Similarly, the curves marked 2° and 4° represent the engine conditions wherein the $\theta_K$ is 2° and 4°, respectively, when run on regular gasoline.

In the knock control method disclosed in the above-mentioned Japanese Unexamined Patent Publication No. 58-167881, the boost pressure is reduced whenever the retard correction value $\theta_K$ exceeds a predetermined value, for example, 5° CA. This results in an increase in the boost pressure when the engine operating conditions fall within the region situated below the curve marked 5° in FIG. 1, although the engine is run on regular gasoline. In contrast, during the transitional period, when the engine conditions are such that they fall within the area located above the 5° curve, then the boost pressure is reduced, causing the aforementioned problems of hunting and delay time.

This invention is based on the concept that, under those engine operating condition wherein the retard correction value $\theta_K$ becomes small although the engine is run on regular gasoline, the retard correction value $\theta_K$ should not be taken into consideration in determining whether or not to reduce the boost pressure.

Figure 2:
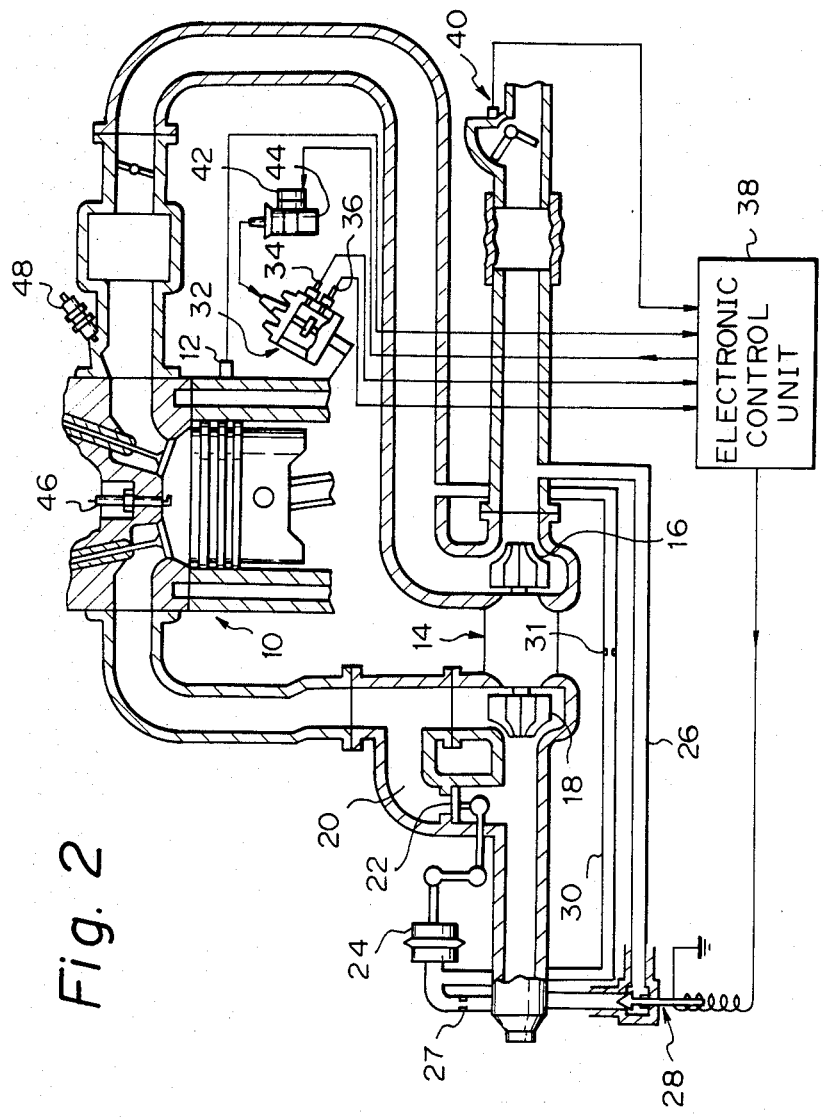
FIG. 2 is a schematic view, partially in cross section, of a supercharged engine to which the knock control system according to the invention is applied.

Referring now to FIG. 2, schematically shown is a supercharged engine having a cylinder block 10 to which a knock sensor or detonation sensor 12 is attached to detect the occurrence and magnitude of knocking. The engine is provided with a turbocharger 14 having a compressor section 16 disposed across an air intake passage, and a turbine section 18 positioned across an exhaust passage. A known waste gate valve 22 is provided across a bypass 20 to control the boost pressure. A conventional diaphragm type actuator 24 is used to actuate the waste gate valve 22 and is operated by a signal pressure transmitted through a conduit 30 from the portion of the intake passage downstream of the compressor 16. A relief conduit 26 having a normally closed solenoid valve 28 communicates a pressure chamber of the actuator 24 with a portion of the intake passage located upstream of the compressor 16, to permit the signal pressure to be released upon energization of the solenoid valve 28. With this arrangement, when the solenoid valve 28 is energized, the waste gate valve 22 closes the bypass 20 and thus increases the boost pressure. Conversely, when the solenoid valve 28 is de-energized, the waste gate valve 22 opens the bypass 20, thus overriding the supercharger. The conduits 26 and 30 are provided with restrictions 27 and 31, respectively, to ensure a smooth movement of the waste gate valve 22.

The engine includes a conventional ignition system having a distributor 32 incorporating known crank angle sensors 34 and 36. The sensor 34 is designed to deliver one pulse signal for each revolution of the distributor shaft, i.e., for every two revolutions of the engine crank shaft. The sensor 34 discriminates the first engine cylinder from other cylinders and outputs a signal when the piston in the first cylinder is in a position just before TDC. The other sensor 36 forms means for sensing the engine rotational speed and is designed to issue one pulse signal for every 30° rotation of the crank shaft.

The signals from the knock sensor 12 and the crank angle sensors 34 and 36 are received by an electronic control unit 38. The control unit 38 also receives signals from an airflow sensor 40 representing the flow rate of intake air through the intake passage.

The electronic control unit 38 signals, via a line, the solenoid valve 28. The control unit 38 is also designed to deliver an ignition signal to an igniter 42, which triggers an ignition coil 44 to generate a high spark voltage which is distributed through the distributor 32 to the spark plugs 46 of the respective cylinders. The control unit 38 is also designed to signal a fuel injector 48 which injects a controlled amount of fuel into the intake air stream to form a combustible mixture. The engine is provided with various other sensors for detecting engine parameters required for fuel control but these sensors are omitted from FIG. 2 for simplicity.

Figure 3A:
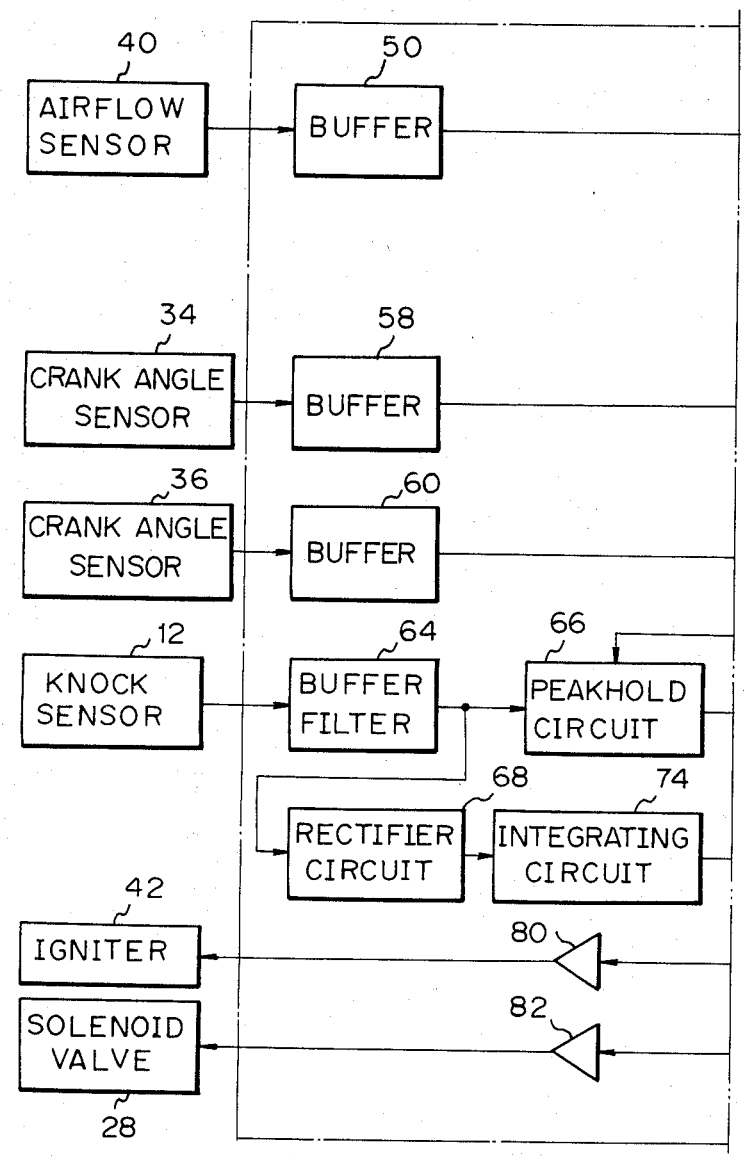
FIG. 3, which consists of FIGS. 3A and 3B, is a block diagram of an electronic control unit.
Figure 3B:
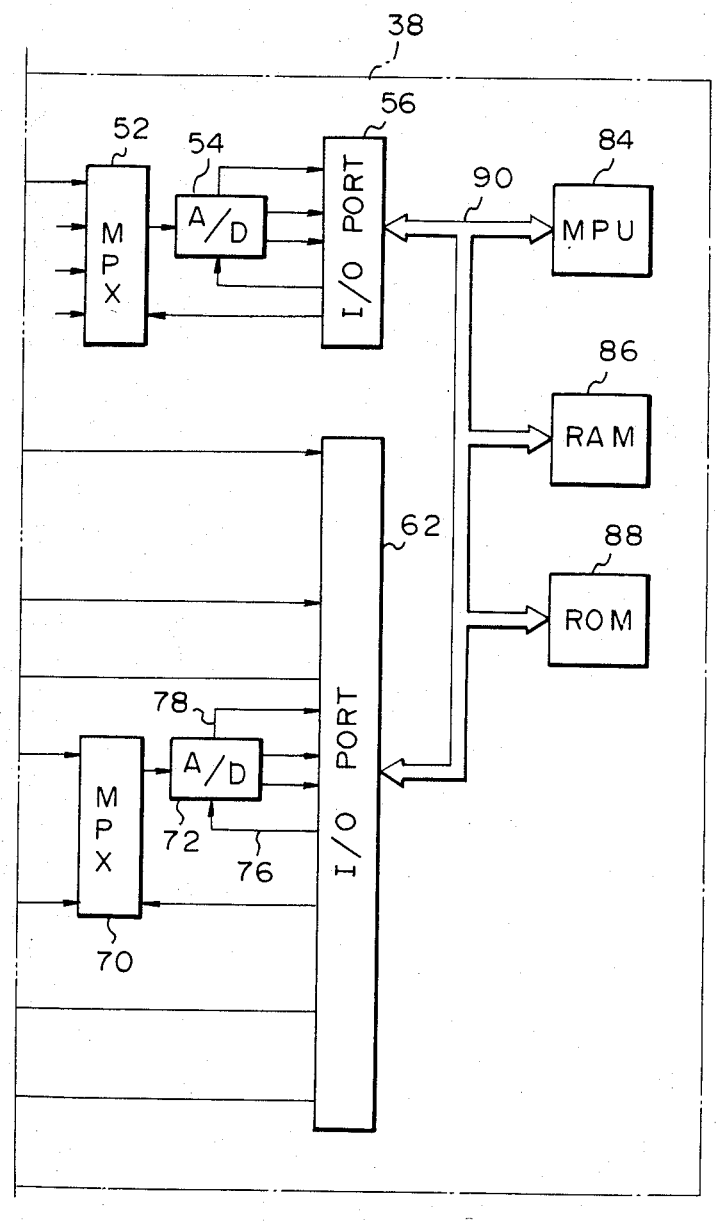

FIG. 3 is a block diagram showing an example of the electronic control unit 38. Analog singals from the airflow sensor 40 are fed through a buffer 50 into a multiplexer 52 and are selectively applied, in response to instructions from a microprocessor 84, to an A/D converter 54, wherein the analog singals are converted into binary signals indicating the air flow rate and are stored in a RAM 86. Signals from the crank angle sensors 34 and 36 are forwarded through buffers 58 and 60, respectively, to an I/O interface 62.

Signals from the knock sensor 12 are input to a buffer filter 64 comprising a band pass filter, which is designed to pass the frequency range of 7 to 8 KHz inherent in knocking vibration. The filtered signals are sent to a peak hold circuit 66 and a rectifier circuit 68, respectively. The peak hold circuit 66 receives the filtered signals only when a high level signal is applied thereon by the microprocessor 84 through the I/O port 62 and a line 68. The peak hold circuit 66 holds the knock sensor signal of the highest magnitude. The output from the peak hold circuit 66 is sent to an analog multiplexer 70 and is selectively applied to an A/D converter 72 in response to command from the microprocessor 84. The A/D converter 72 converts the analog input to a binary signal and delivers it through the I/O port to the microprocessor 84. The rectifier circuit 68 fully or partly rectifies the filtered knock sensor signals and the rectified signals are sent to an integrating circuit 74 and integrated with respect to time. Thus, the integrating circuit 74 issues an output signal which is an average of the magnitude of the signals from the knock sensor 12. The output from the integrating circuit 74 is forwarded to the multiplexer 70 and is selectively applied to the A/D converter 72 for conversion to a binary signal. The microprocessor 84 addresses the A/D converter 72 to read the binary signal, and the A/D converter 72 commences conversion upon receipt of an initiating signal from the microprocessor 84 through the I/O port 62 and line 76. Upon completion of the A/D conversion, the converter 72 delivers a completion signal to the microprocessor over a line 78 and through the I/O port 62.

The microprocessor 84 delivers an ignition signal in the form of a pulse through the I/O port 62 to a drive circuit 80, which amplifies the ignition signal and energizes the igniter 42. The igniter 42 triggers the ignition coil 44 in accordance with the timing and pulsewidth of the ignition signal, to generate a high tension voltage in the secondary windings of the ignition coil.

The microprocessor 84 also delivers a one bit control signal through the I/O port 62 to a drive circuit 82, which amplifies the control signal to carry out ON-/OFF control of the solenoid valve 28. As mentioned before, the supercharger boost pressure is lowered when the solenoid valve 28 is de-energized, and is raised when the solenoid valve 28 is energized.

The electronic control unit 38 further includes a ROM 88, a bus 90 connecting various components of the unit, a memory control circuit (not shown), and a clock generator circuit (not shown). The knock control system according to the invention is implemented in part by the electronic control unit 38. To this end, the ROM 88 stores a program therefore which will be described below with reference to a flow diagram shown in FIG. 4. The ROM 88 also stores various data and tables necessary for performing the program.

Figure 4A:
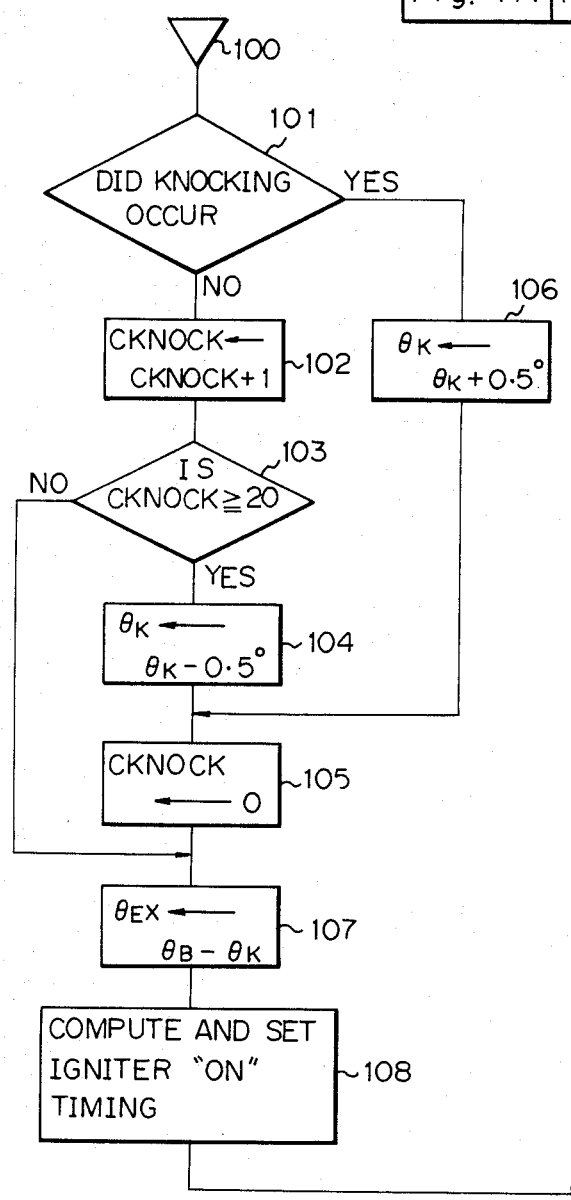
FIG. 4, which consists of FIGS. 4A and 4B, is a flow diagram of a knock control routine implemented by the electronic control unit.
Figure 4B:
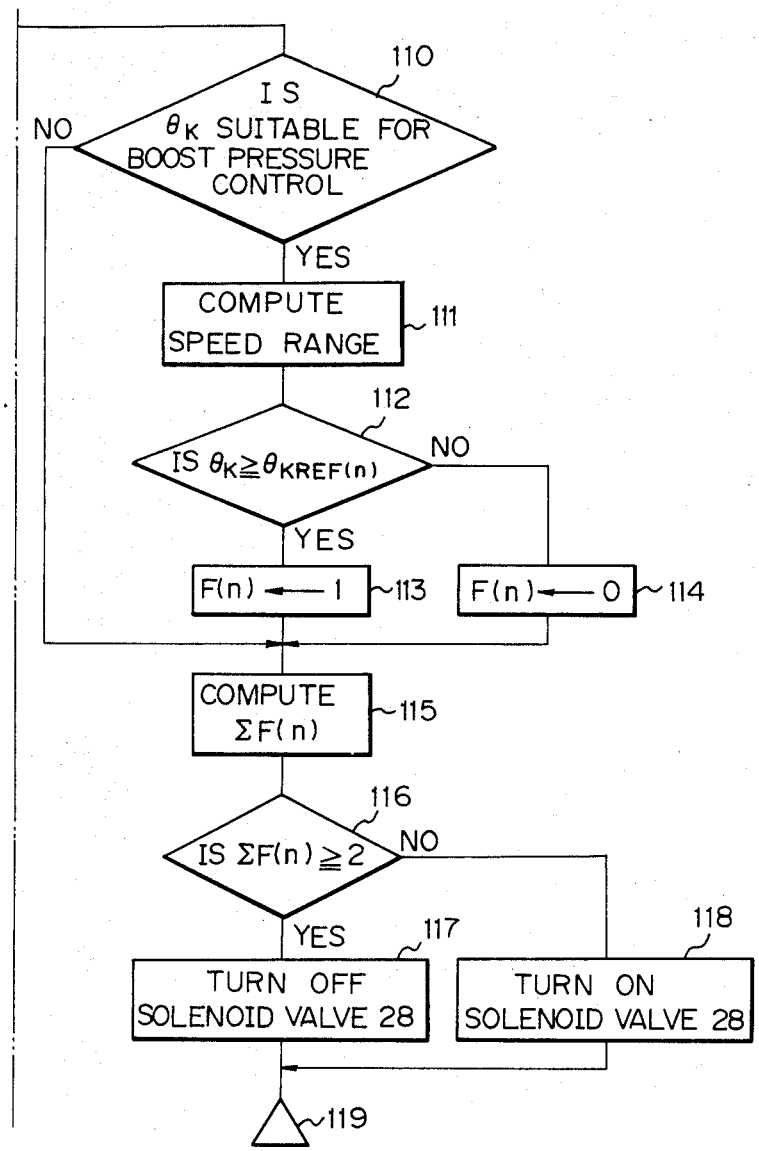

Referring to FIG. 4 wherein the flow diagram of the functions performed by the control unit is shown, at function 100 the program is initiated for every 180° CA. Briefly, at functions 101 through 107 the retard correction value $\theta_K$ is computed in response to the condition of knocking and the executive spark advance $\theta_{EX}$ is computed. At function 101, the microprocessor 84 determines if knocking occurred during the immediately preceding combustion. This function 101 may be performed in the following manner. First, a knock determination level is computed by multiplying the binary output generated by A/D conversion of the output from the integrating circuit 74. Then the microprocessor 84 compares the knock determination level with the binary output obtained by A/D conversion of the output from the peak hold circuit 66. If the binary output from the peak hold circuit 66 is greater than the knock determination level, then the microprocessor decides that knocking had occurred in the preceding combustion. If the binary output is smaller, then a decision is made that knocking did not occur.

If function 101 determines that knocking occurred, then function 106 is performed to increment $\theta_K$ by 0.5° CA ($\theta_K \leftarrow \theta_K + 0.5°$).

On the other hand, if function 101 determines that knocking did not occur, then function 102 counts up by one a counter CKNOCK provided by the RAM 86 for counting the number of non-occurrences of knocking (CKNOCK←CKNOCK+1). Then function 103 determines whether or not the number of the counter CKNOCK is equal to or greater than 20. If it is not, function 107 is performed. If it is, that is, if knocking has not occurred for a count of 20, function 104 decrements the $\theta_K$ by 0.5° CA ($\theta_K \leftarrow \theta_K - 0.5°$). It will be understood that, in this way, the $\theta_K$ decremented only after the non-occurrence of knocking has reached a count of more than 20. This is preferable in that incrementing of the $\theta_K$ by an incorrect determination is avoided. Thus, the ignition timing is advanced (i.e., decrementation of $\theta_K$) only little-by-little. Conversely, the $\theta_K$ is incremented at function 106 whenever knocking has occurred even once, so that the spark timing is promptly retarded.

Then function 105 resets the counter CKNOCK to zero. By repeating the above functions, the retard correction value $\theta_K$ will be increased in response to the occurrence of knocking and decreased in response to the non-occurrence thereof. The knock determination level at function 101 may be selected at such value that the engine continuously generates only a predetermined small magnitude of knocking while maintaining the $\theta_K$ at a constant value.

At function 107, the retard correction value $\theta_K$ is subtracted from the basic spark advance $\theta_B$ to compute the final executive spark advance $\theta_{EX}$ ($\theta_{EX} \leftarrow \theta_B - \theta_K$). As is well known in the art, this function 107 may be performed in the following manner. The revolutional speed of the engine Ne is computed based on signals from the crank angle sensors 34 and 36. The flow rate Q of intake air is obtained from signals from the airflow sensor 40. The Q/N representative of the engine load is calculated from the thus-obtained Ne and Q. Then, based on Ne and Q/N, the basic spark advance $\theta_B$ is obtained by a table look up routine and interpolation. To this end, a basic spark advance $\theta_B$ table has been stored in the ROM 88. The basic spark advance table is set in such a manner that a predetermined magnitude of knocking occurs when the engine is run on leaded gasoline and when the engine is operating under a heavy load. Generally, when leaded gasoline is used, a predetermined magnitude of knocking will occur under a heavy load condition so that the retard correction value $\theta_K$ will be on the order of 0° to 3°. On the other hand, when regular gasoline is used, the $\theta_K$ will have a larger value.

Then, function 108 computes the timing at which the igniter 42 is to be turned "ON", based on the executive spark advance $\theta_{EX}$ and the actual time. The thus-computed timing is set to an output register of the I/O port 62. When the set timing arrives, the igniter 42 triggers the ignition coil 44 to provide a high tension spark voltage to the spark plug 46.

Figure 5:
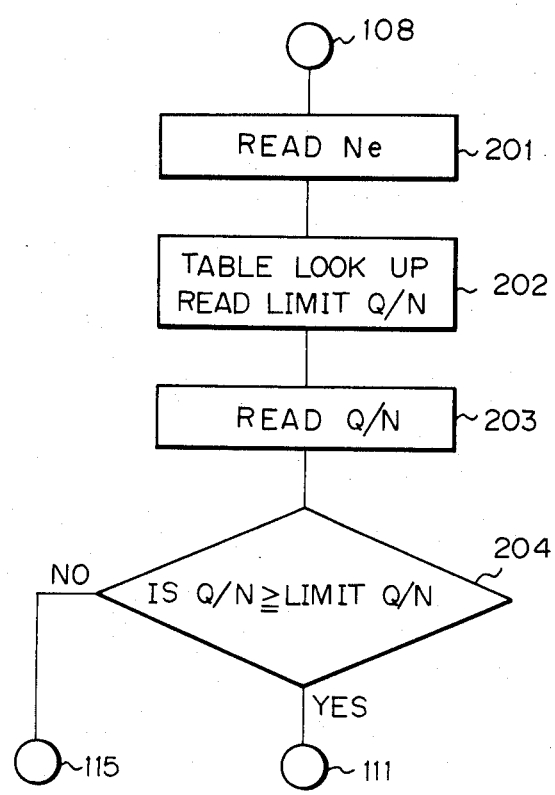
FIG. 5 is a flow diagram showing in greater detail the engine load threshold value determination function shown in FIG. 4.

Function 110 characterizes the knock control system according to the invention. Namely function 110 determines whether or not the present retard correction value $\theta_K$ is suitable for supercharger boost pressure control. Function 110 may be performed as a subroutine shown in the flow diagram of FIG. 5. Namely, function 201 reads out the actual rotational speed of the engine.

Then, the table look up function 202 accesses the ROM 88 and reads out a predetermined engine load threshold value LIMIT Q/N corresponding to the actual engine speed. The engine load threshold value LIMIT Q/N is a variable depending on the engine speed and is set as shown by the solid line in the graph of FIG. 6. As will be understood by a comparison of FIG. 1 with FIG. 6, the engine load threshold value LIMIT Q/N is an approximation of the engine-load/engine-speed characteristic for the retard correction value in the range of 5° to 7° CA, preferably 6° CA. The table corresponding to the engine load threshold value LIMIT Q/N shown in FIG. 6 has been preliminarily stored in the ROM 88 and function 202 determines a particular LIMIT Q/N for the actual engine speed via a table look up routine and interpolation. Then, function 203 reads out the actual engine load represented in terms of Q/N. Function 204 then determines whether the actual engine load Q/N is equal to or greater than the particular engine load threshold value LIMIT Q/N. If it is, function 111 is performed, and if it is not, functions 111 through 114 are omitted, thereby jumping to function 115.

Figure 6:
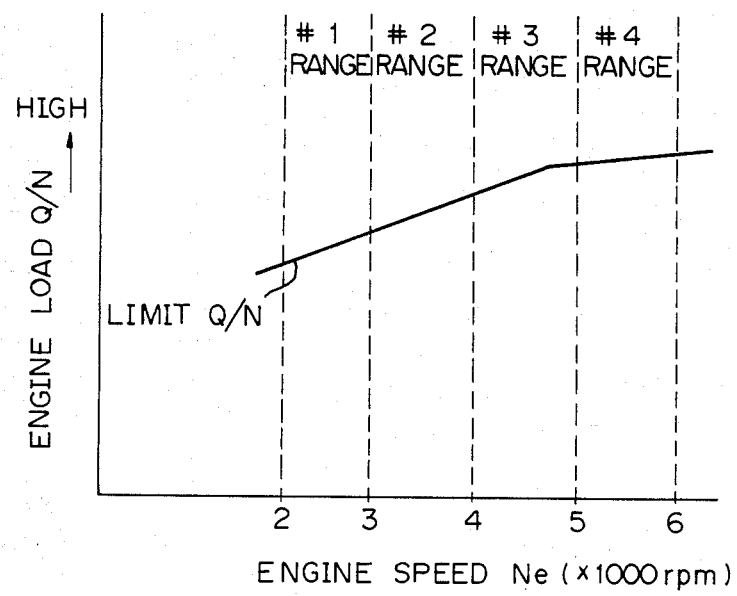
FIG. 6 is a graph showing reference values for different speed ranges.

It will be understood from the graph of FIG. 6 that the determination at function 204 will be affirmative when the actual engine speed and load correspond to the region situated above the curve of LIMIT Q/N. On the other hand, the determination will be negative when the actual engine speed and load are located below the curve of LIMIT Q/N. Since the curve of LIMIT Q/N of FIG. 6 is an approximation of the dotted line curve for the retard correction value of 6° CA shown in FIG. 1, functions 111 through 114 will be skipped when the engine is run on regular gasoline and when the engine operating conditions are such that the retard correction value $\theta_K$ is smaller than 6° CA. It should be appreciated that, by setting the predetermined engine load threshold value LIMIT Q/N as above mentioned and by comparing the actual engine load with the threshold value LIMIT Q/N, it is possible, in the determination of whether or not to increase the boost pressure to eliminate the effect of the retard correction value $\theta_K$ under those engine operating conditions in which the $\theta_K$ value becomes small although the engine is run on regular gasoline.

Returning to the flow diagram of FIG. 4, functions 111 through 118 compare the retard correction value $\theta_K$ with the reference value, to control the boost pressure. According to the preferred embodiment of the invention, functions 111 through 118 are framed in such a manner that the retard correction value $\theta_K$ is compared with a plurality of reference values set for different ranges of engine speed, and that the boost pressure is lowered only when the $\theta_K$ is greater than the reference values for a predetermined number of speed ranges.

In more detail, if the determination at function 110 is affirmative, function 111 is performed to determine in what speed range the actual engine speed falls. In the present embodiment, the engine speed is divided into four ranges as shown in FIG. 6. A common reference value $\theta_{KREF}$ of, for example, 5° CA, may be assigned to respective speed ranges. Alternatively, different reference values $\theta_{KREF(n)}$ may be preferably assigned to different speed ranges. In the latter case, the reference value $\theta_{KREF(n)}$ for respective speed ranges is preferably slightly smaller than the values of the LIMIT Q/N shown in FIG. 6.

Then function 112 determines whether the present retard correction value $\theta_K$ is equal to or greater than the reference value $\theta_{KREF(n)}$ for a particular speed range. If it is, then function 113 sets a flag F(n) for that speed range provided in the RAM 86. If it is not, then function 114 is performed to reset the flag F(n) to zero. Flags F(n) are provided for respective speed ranges. In this manner, if the retard correction value $\theta_K$ is equal to or greater than the reference value $\theta_{KREF(n)}$ for a particular speed range Ne(n), the flag F(n) for that range is set to "1". If not, that flag F(n) is reset to zero.

Then, at function 115, the sum $\Sigma F(n)$ of the flags F(n) is computed, and function 116 determines if the sum $\Sigma F(n)$ is equal to or greater than "2". If it is, then the solenoid valve 28 is turned OFF at function 117. If it is not, function 118 is performed to turn the solenoid valve 28 ON. Turning ON the solenoid valve 28 causes the conduit 26 to be opened whereby the signal pressure supplied to the actuator 24 is released toward the portion of the intake passage located upstream of the compressor 16. This causes the waste gate valve 22 to close, thereby increasing the boost pressure. On the other hand, when the solenoid valve 28 is turned OFF, the waste gate valve 22 is opened and the boost pressure lowered. The knock control routine is completed at 119 where the microprocessor returns to the main routine.

In this manner, the boost pressure is lowered only when the retard correction value $\theta_K$ exceeds the reference value $\theta_{KREF(n)}$ for two or more speed ranges. This will occur when the engine is run on regular gasoline. On the other hand, the boost pressure is increased when the $\theta_K$ exceeds the $\theta_{KREF}$ for none of the speed ranges or for only one of the ranges. This may occasionally occur when leaded gasoline is used. Thus, there is no likelihood of the boost pressure being inadvertently increased when the engine is run on regular gasoline, and thus the boost pressure control can be performed with an improved reliability.

It will be noted that, if the determination at function 110 is negative, then functions 111 through 114 are skipped so that the flags F(n) are not renewed. In that event, the boost pressure remains unchanged.

Although the present invention has been described herein with reference to the specific embodiments thereof, it is understood that various modifications and changes are obvious for those skilled in the art. For example, although the supercharger has been described as comprising a turbocharger, the present invention is applicable to an engine provided with an engine driven supercharger such as a Root's pump. In that case, the boost pressure is controlled by positioning a bypass control valve via the actuator 24, as known in the art. Also, function 112 has been described as comparing the retard correction value $\theta_K$ with the reference values. However, a learned value may be employed instead of the $\theta_K$ as computed at functions 101 through 106. Furthermore, the number of speed ranges may be varied and, accordingly, function 116 may be determined based on a different rate.

What is claimed:

1. A knock control system for a supercharged spark-ignition internal-combustion engine having a supercharger and an electronic ignition system, comprising:
   means for determining a basic spark advance in said ignition system in response to actual rotational speed and load of the engine;
   means for determining a retard correction value in response to an occurrence of detonation;

means for correcting the basic spark advance by the retard correction value to determine an executive spark advance, by which the electronic ignition system causes an ignition spark to be generated;

means for comparing the retard correction value with at least one predetermined reference value;

boost pressure control means for reducing a supercharger boost pressure in response to the retard correction value being greater than the predetermined reference value, and for increasing the boost pressure in response to the retard value being smaller than the predetermined reference value;

memory means for storing predetermined engine load threshold values for different rotational speeds of the engine;

means for sensing an actual engine speed;

means responsive to the actual engine speed for accessing the memory means and retrieving therefrom a predetermined engine load threshold value for the actual engine speed;

means for sensing an actual engine load;

means for comparing the actual engine load with said predetermined engine load threshold value for said actual engine speed; and means for cancelling the operation of said boost pressure control means when the actual engine load is smaller than the engine load threshold value.

2. The knock control system according to claim 1, wherein said predetermined engine load threshold values stored in said memory means are approximations of an engine-load/engine-speed characteristic for a retard correction value in a range of 5 to 7 degrees as empirically determined when the engine is run on regular gasoline.

3. The knock control system according to claim 2, wherein the retard correction value is compared with a plurality of reference values predetermined for different ranges of engine speed and wherein said means for reducing the supercharger boost pressure lowers the boost pressure when the retard correction value is greater than the reference values for a predetermined number of engine speed ranges.

4. The knock control system according to claim 1, wherein the retard correction value is compared with a plurality of reference values predetermined for different ranges of engine speed and wherein said means for reducing the supercharger boost pressure lowers the boost pressure when the retard correction value is greater than the reference values for a predetermined number of engine speed ranges.

* * * * *